(12) United States Patent
Cha

(10) Patent No.: US 10,731,515 B2
(45) Date of Patent: Aug. 4, 2020

(54) HYBRID TYPE POWER GENERATION SYSTEM

(71) Applicant: DOOSAN HEAVY INDUSTRIES & CONSTRUCTION CO., LTD., Changwon-si, Gyeongsangnam-do (KR)

(72) Inventor: Song Hun Cha, Osan-si (KR)

(73) Assignee: Doosan Heavy Industries Construction Co., Ltd., Gyeongsangnam-do (KR)

(*) Notice: Subject to any disclaimer, the term of this patent is extended or adjusted under 35 U.S.C. 154(b) by 305 days.

(21) Appl. No.: 15/712,351

(22) Filed: Sep. 22, 2017

(65) Prior Publication Data

US 2018/0087408 A1 Mar. 29, 2018

(30) Foreign Application Priority Data

Sep. 28, 2016 (KR) .................. 10-2016-0124941

(51) Int. Cl.
| | |
|---|---|
| *F01K 25/10* | (2006.01) |
| *F01K 17/02* | (2006.01) |
| *F01K 7/32* | (2006.01) |
| *F01K 3/18* | (2006.01) |
| *F01K 7/22* | (2006.01) |
| *F01K 11/02* | (2006.01) |

(52) U.S. Cl.
CPC .............. *F01K 25/103* (2013.01); *F01K 3/18* (2013.01); *F01K 7/22* (2013.01); *F01K 7/32* (2013.01); *F01K 11/02* (2013.01); *F01K 17/02* (2013.01); *Y02E 20/14* (2013.01); *Y02P 80/15* (2015.11)

(58) Field of Classification Search
CPC .......... F01K 25/103; F01K 7/32; F01K 11/02; F01K 9/003; F01K 17/02; Y02E 20/14
See application file for complete search history.

(56) References Cited

U.S. PATENT DOCUMENTS

| | | | | |
|---|---|---|---|---|
| 3,971,211 A | * | 7/1976 | Wethe | F01K 7/32 60/39.181 |
| 10,101,092 B2 | * | 10/2018 | Stapp | F28F 9/001 |
| 2012/0047892 A1 | * | 3/2012 | Held | F01K 3/185 60/652 |

FOREIGN PATENT DOCUMENTS

| | | |
|---|---|---|
| CN | 103244214 A | 8/2013 |
| JP | 2006-169971 A | 6/2006 |
| KR | 20130036180 A | 4/2013 |
| KR | 10-1409314 B1 | 3/2014 |
| KR | 10-2014-0064704 A | 5/2014 |
| KR | 10-1628030 B1 | 5/2016 |

* cited by examiner

*Primary Examiner* — Mark A Laurenzi
*Assistant Examiner* — Xiaoting Hu
(74) *Attorney, Agent, or Firm* — Invenstone Patent, LLC

(57) ABSTRACT

A hybrid type power generation system in which some of components of a cogeneration system are combined with a supercritical $CO_2$ power generation system, may increase an energy output by combining some of the components of the cogeneration system with the supercritical $CO_2$ power generation system.

17 Claims, 11 Drawing Sheets

[FIG. 1]
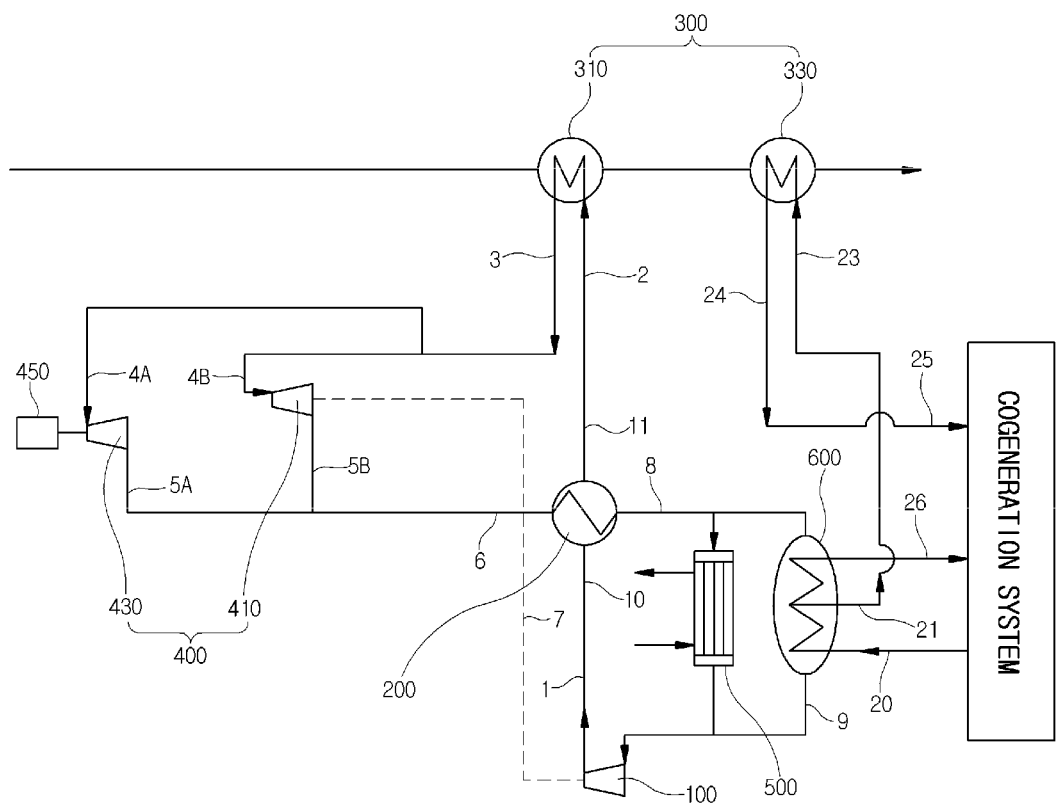

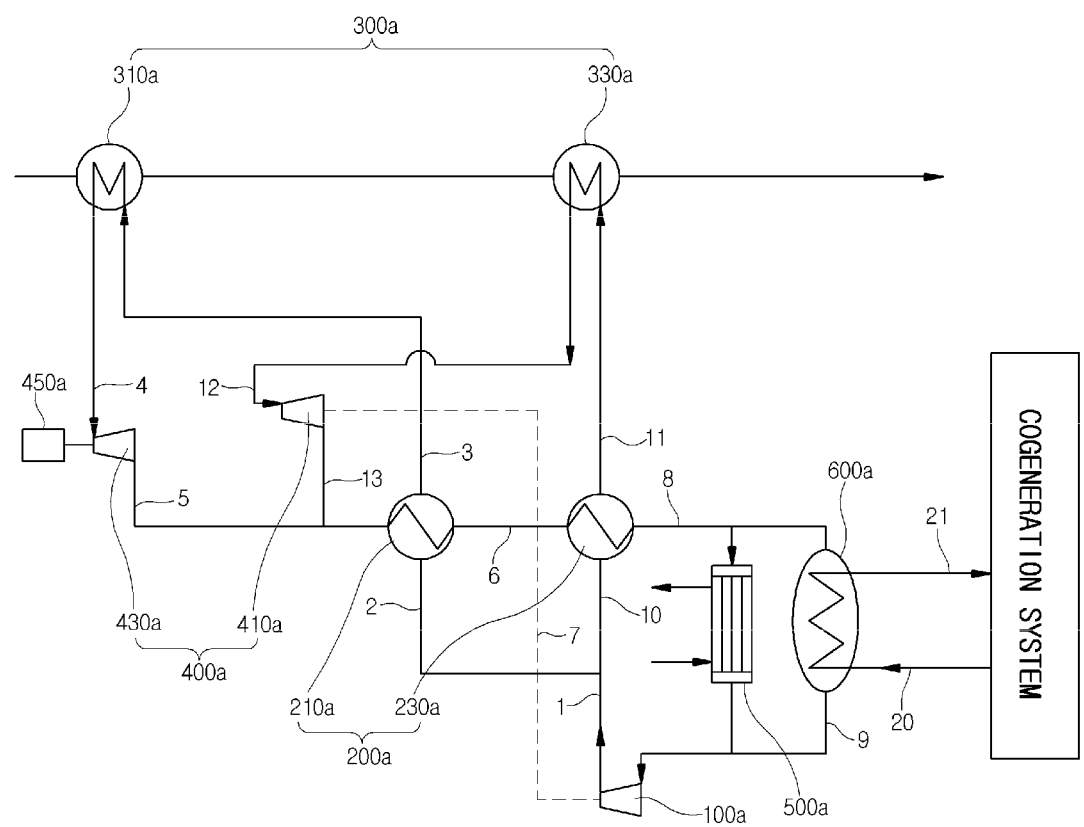
[FIG. 2]

[FIG. 3]
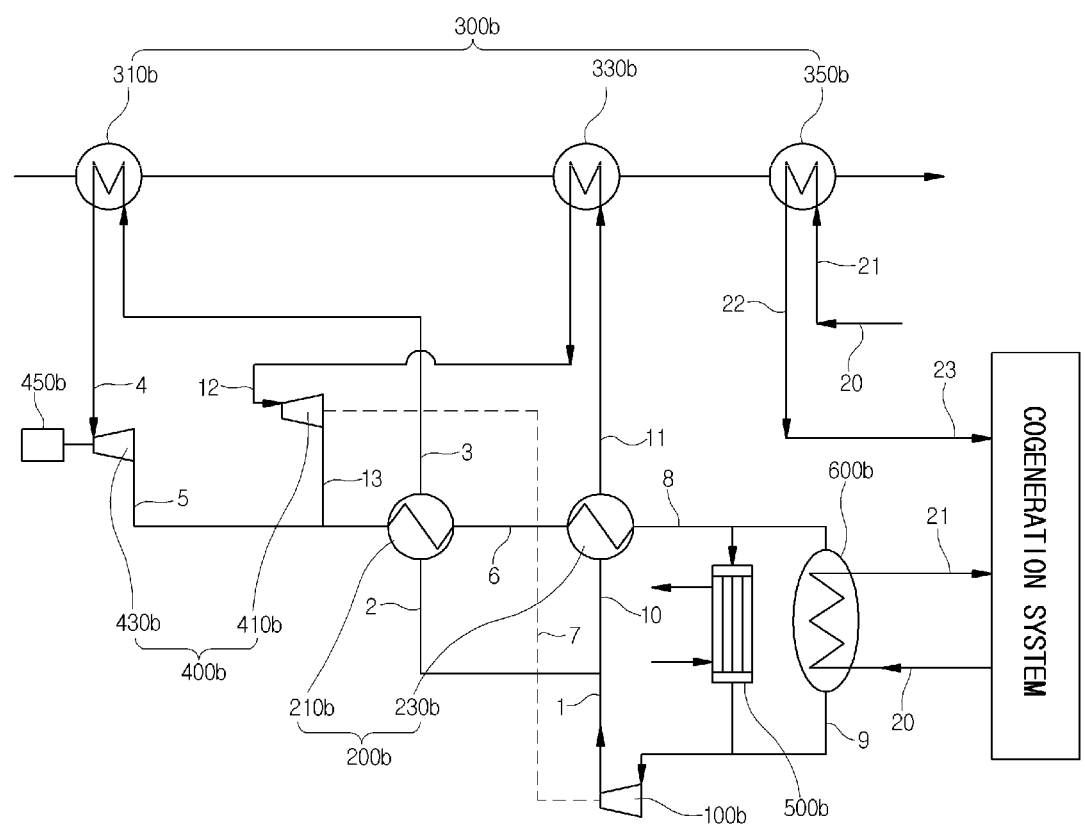

[FIG. 4]
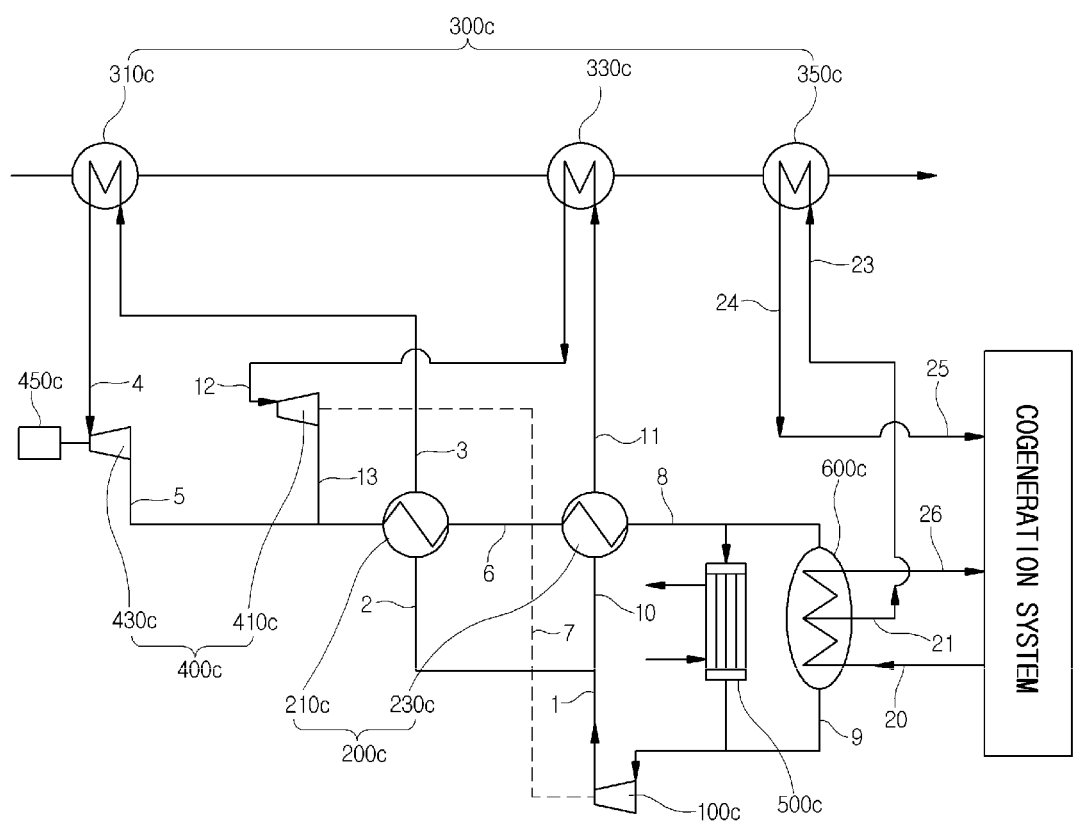

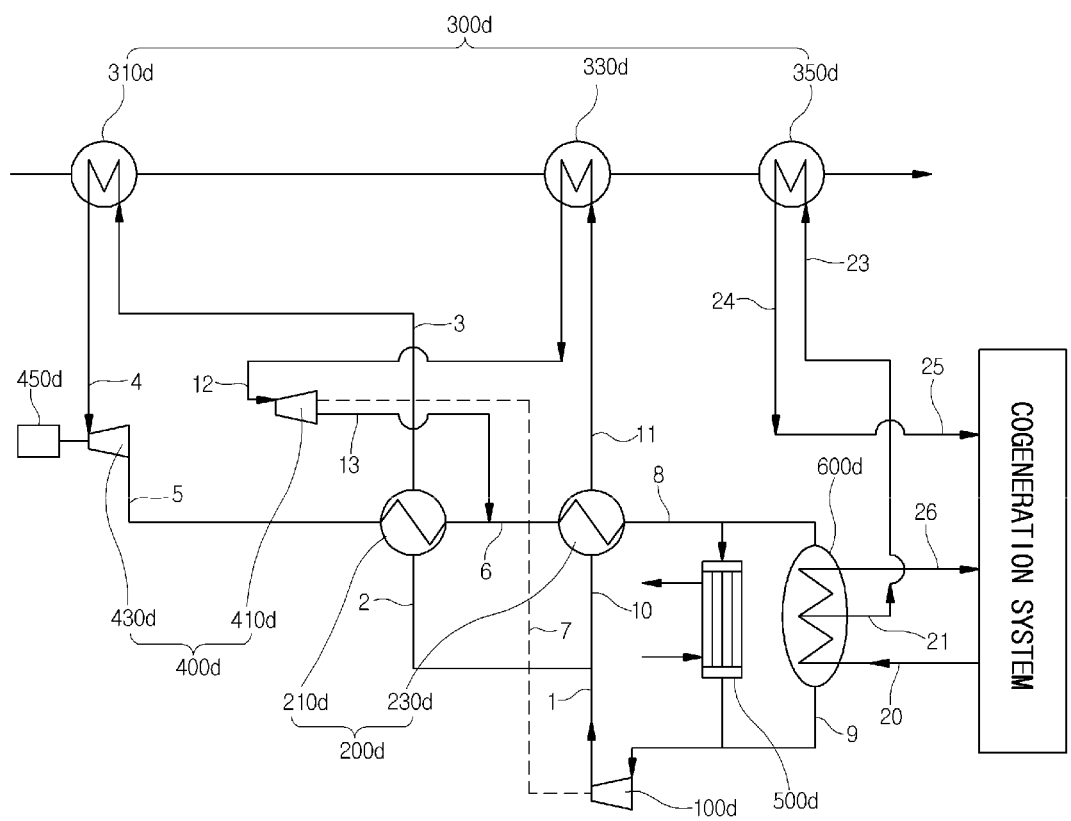
[FIG. 5]

[FIG. 6]
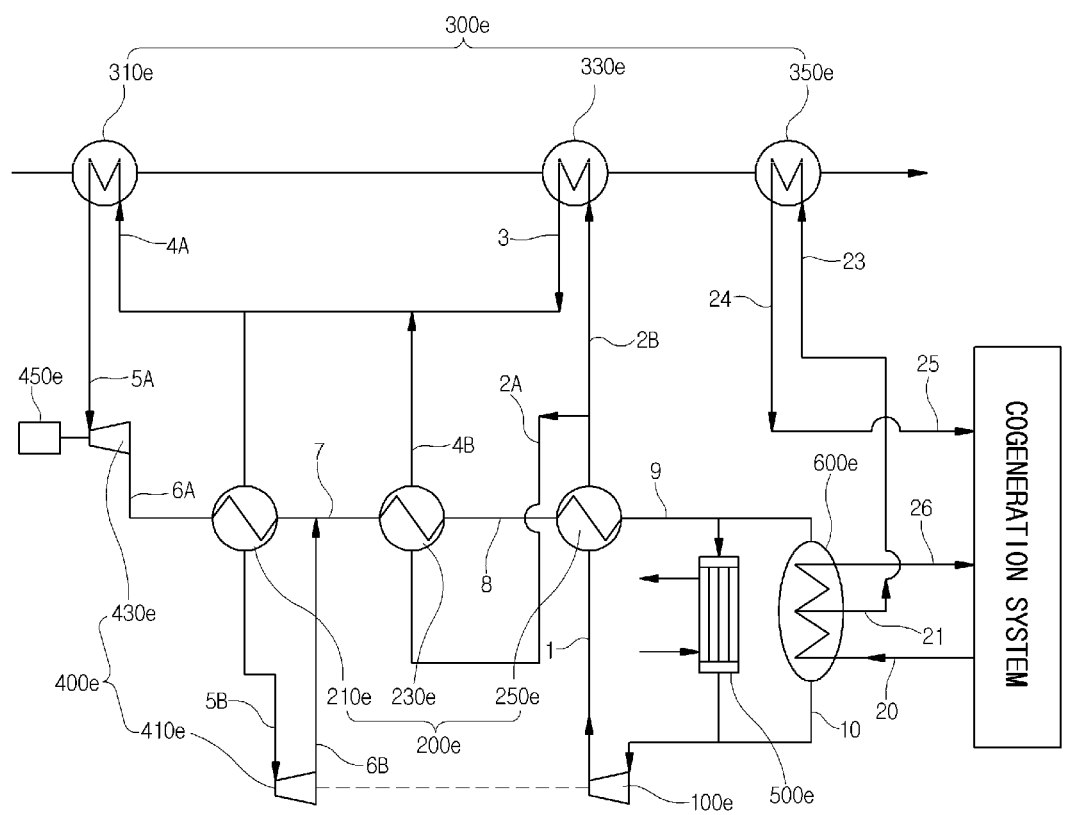

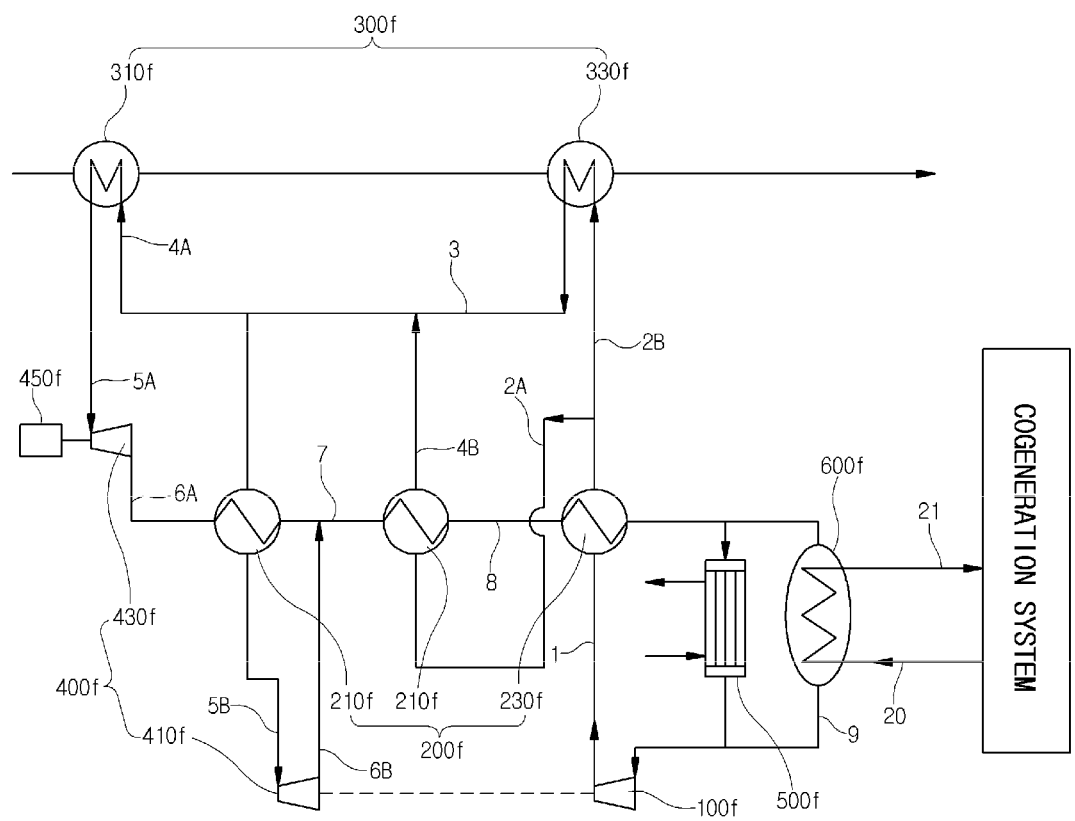
[FIG. 7]

[FIG. 8]
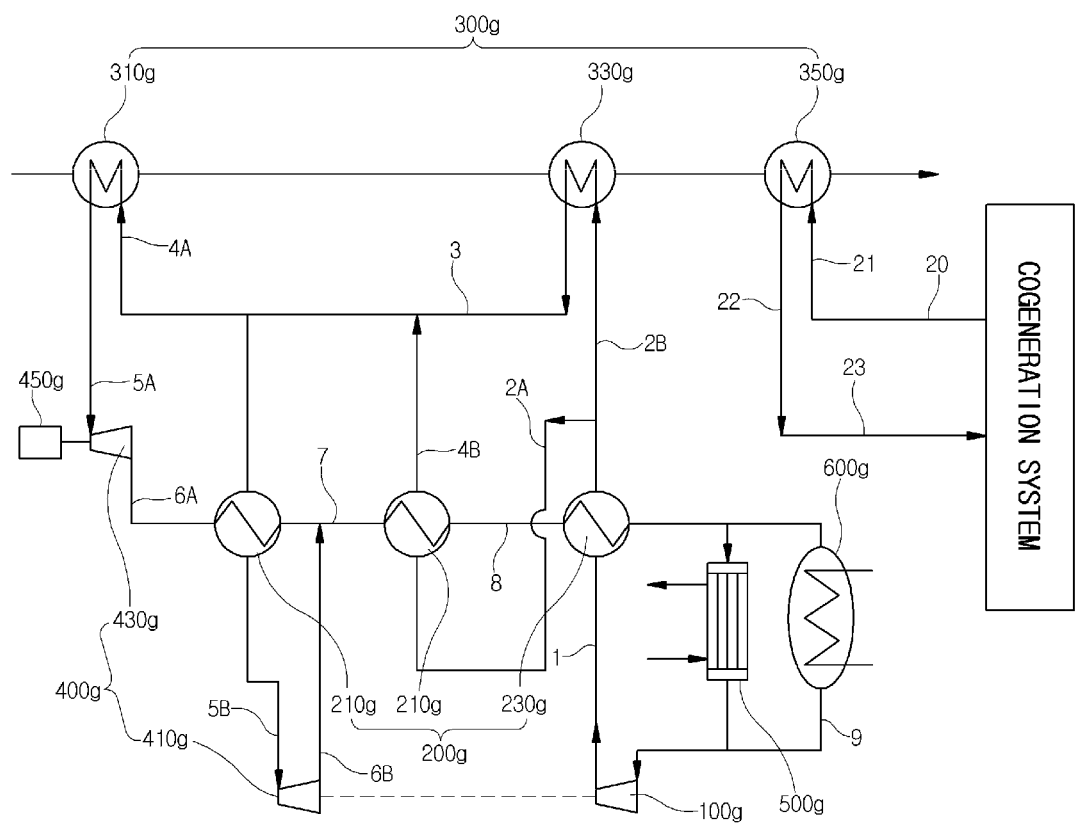

[FIG. 9]
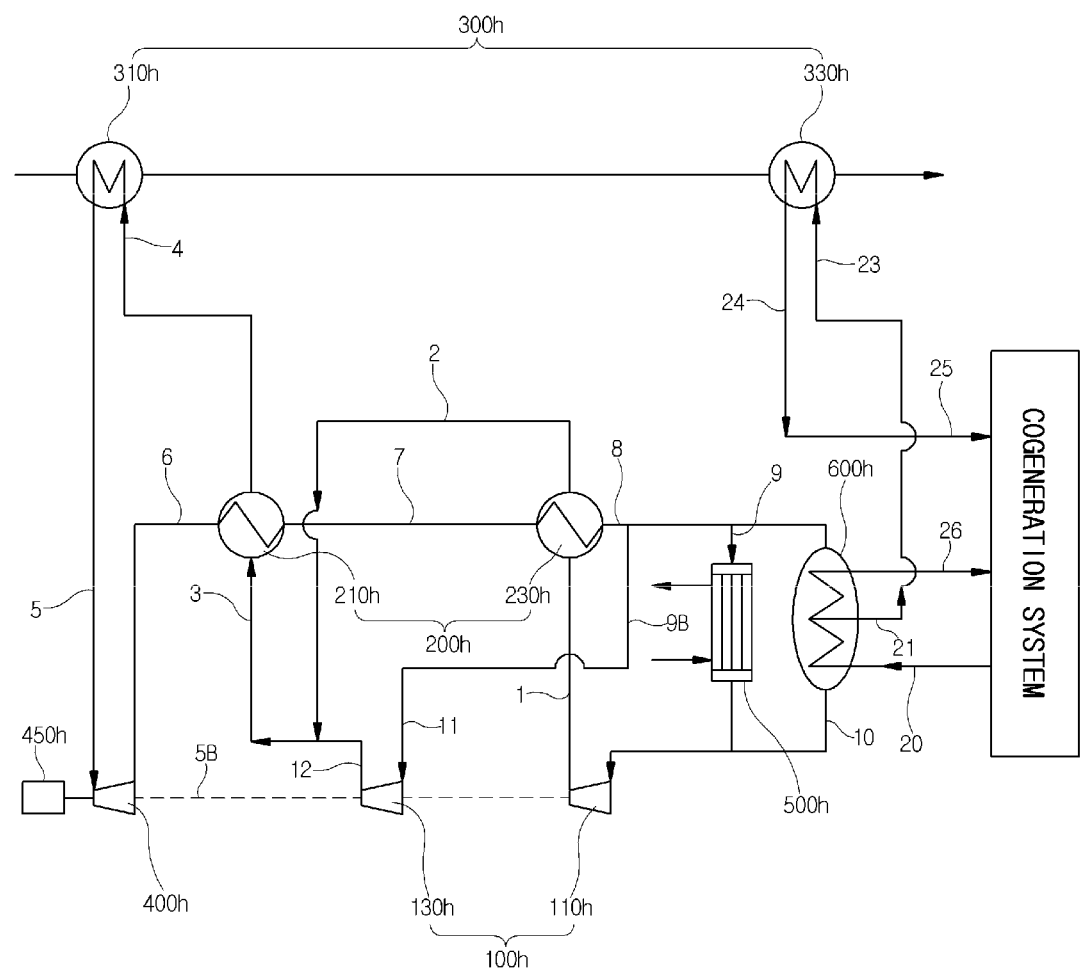

[FIG. 10]
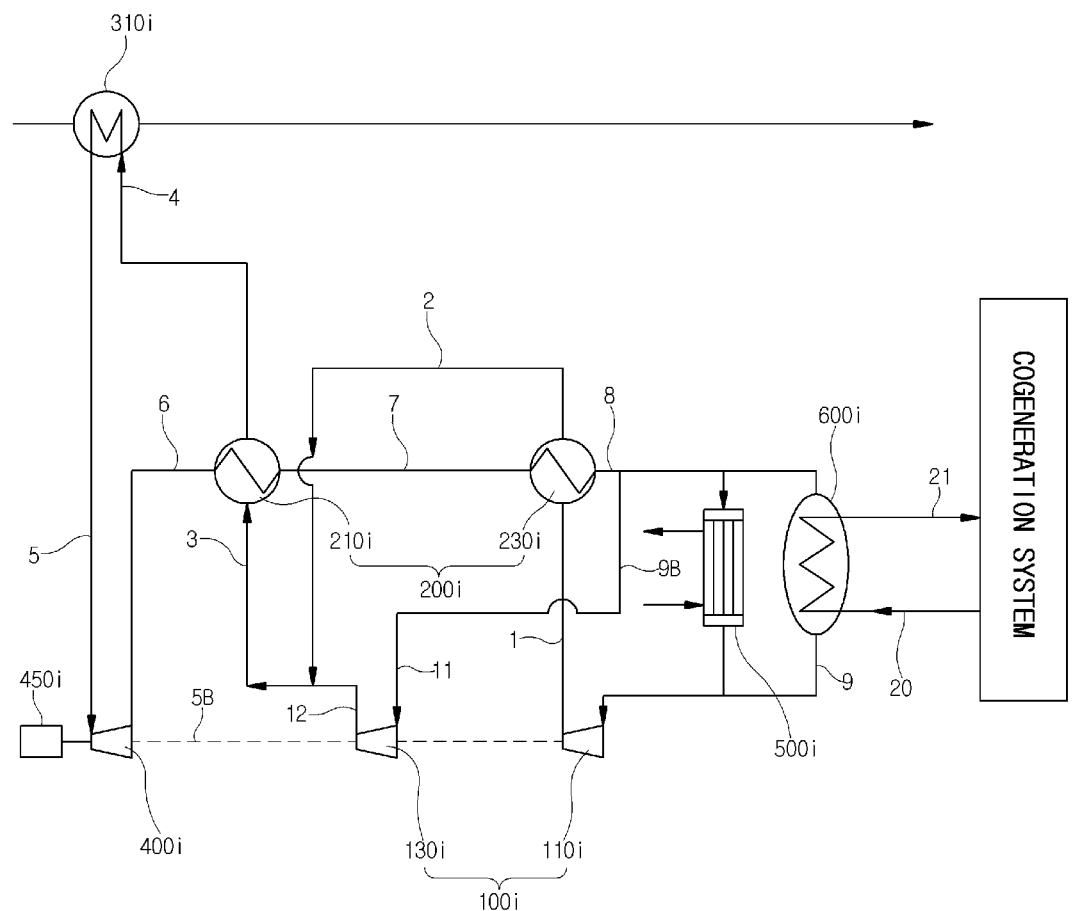

[FIG. 11]
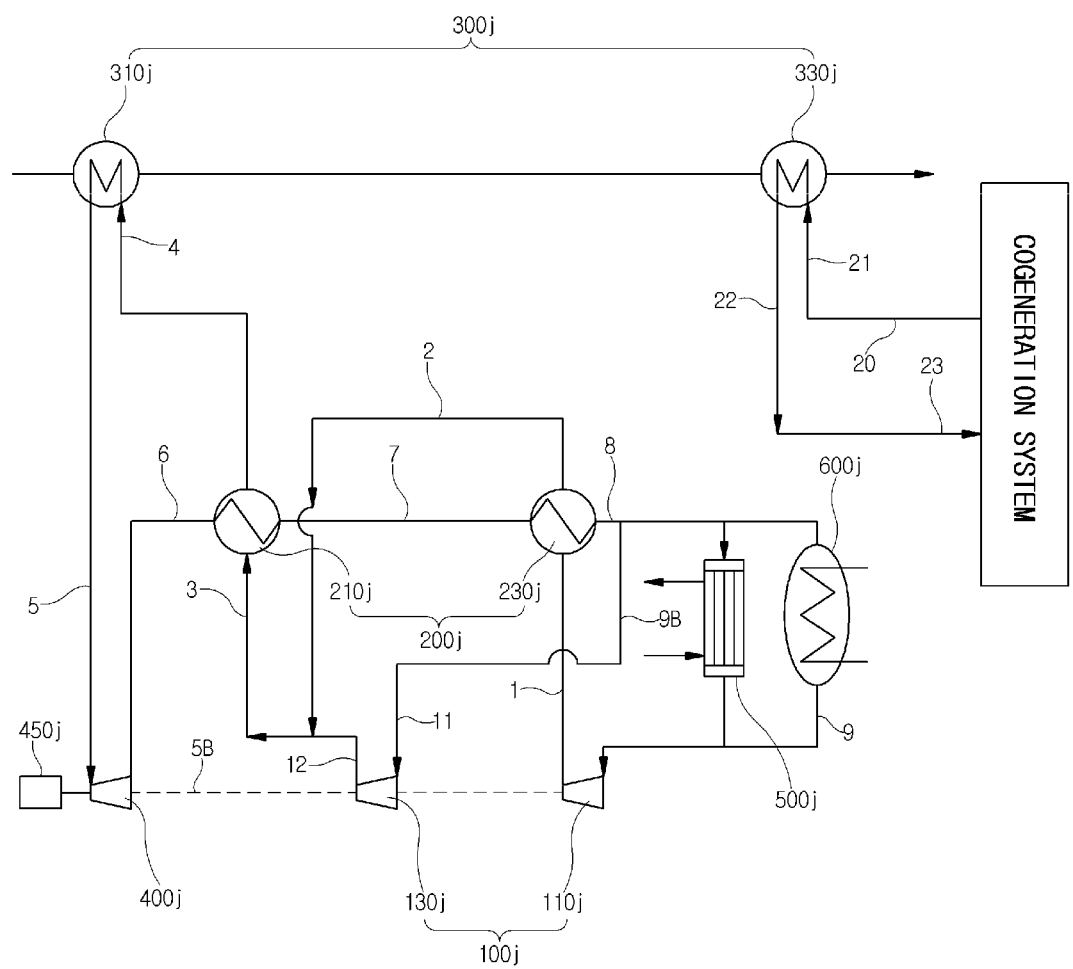

HYBRID TYPE POWER GENERATION SYSTEM

CROSS-REFERENCE TO RELATED APPLICATIONS

This application claims priority to Korean Patent Application No. 10-2016-0124941, filed on Sep. 28, 2016, the disclosure of which is incorporated herein by reference in its entirety.

BACKGROUND

Exemplary embodiments of the present disclosure relate to a hybrid type power generation system, and more particularly, to a hybrid type power generation system in which some components of a cogeneration system are combined with a supercritical $CO_2$ power generation system.

As efficiency in power production is gradually increased and a move to decrease emission of pollutants has become active globally, various efforts for increasing a power output while decreasing emission of pollutants have been made. As one of such efforts, research and development of a supercritical $CO_2$ power generation system using a supercritical $CO_2$ as a working fluid as disclosed in Korean Patent Laid-Open Publication No. 2013-0036180 has been conducted.

The supercritical $CO_2$ has a density similar to a liquid state and viscosity similar to gas, such that equipment may be miniaturized and power consumption required to compress and circulate a fluid may be reduced. At the same time, the supercritical $CO_2$ having critical points of 31.4° C. and 72.8 atm is much lower than water having critical points of 373.95° C. and 271.7 atm and thus may be handled more easily.

In addition, the supercritical $CO_2$ power generation system is mostly operated as a closed cycle in which the carbon dioxide used for power generation is not discharged to the outside, which can greatly contribute to reduction emission of pollutants by country.

However, the existing supercritical $CO_2$ power generation system is difficult to increase capacity beyond a certain scale, and thus only a part of the required power amount can be supplied. In addition, in the case of coal-fired power generation, reduction of the emission of pollutants is needed while increasing the power generation efficiency.

Therefore, a method that can improve the supercritical $CO_2$ power generation system and the coal-fired power generation system and to increase the power generation efficiency is desirable.

BRIEF SUMMARY

An object of the present disclosure is to provide a hybrid type power generation system capable of increasing an energy output by combining a part of components of a cogeneration power generation system with a supercritical $CO_2$ power generation system.

Other objects and advantages of the present disclosure can be understood by the following description, and become apparent with reference to the embodiments.

In accordance with one aspect of the present disclosure, a hybrid type power generation system in which a supercritical $CO_2$ power generation system producing electric energy using supercritical $CO_2$ as a working fluid and a cogeneration system producing thermal energy and electric energy by combusting fuel are combined with each other, the hybrid type power generation system includes: at least one pump configured to circulate the working fluid; at least one recuperator configured to primarily heat the working fluid passing through the pump; at least one heat exchanger configured to reheat the working fluid heated by the recuperator using waste heat as a heat source; a plurality of turbines configured to be driven by the working fluid reheated by the heat exchangers; a condenser configured to cool the working fluid passing through the turbine and introduced into the recuperator to cool the working fluid heating the working fluid passing through the pump; and a water heater configured to heat the heating water by branching a part of the working fluid introduced into the condenser and exchanging heat between the branched working fluid and the heating water supplied from the cogeneration system and cool the working fluid, in which the supercritical $CO_2$ power generation system and the cogeneration system may share the water heater.

The working fluid passing through the condenser and the water heater may be circulated to the pump.

The heating water may be heated by any one of the heat exchangers and then supplied to the cogeneration system.

The heating water may be supplied to the water heater and then a part or all of the heating water may be supplied to heat exchanger or may be supplied from the cogeneration system to the water heater and the heat exchanger, respectively.

The working fluid passing through the pump may be primarily heated by the recuperator, transferred to the heat exchanger to be secondarily heated and then branched, and then supplied to a plurality of turbines, respectively.

The recuperator and the heat exchanger may be provided in plural, and the working fluid passing through the pump may be branched into the plurality of recuperators to be primarily heated, supplied to the plurality of heat exchangers, respectively, to be secondarily heated, and then supplied to the plurality of turbines, respectively.

The recuperator and the heat exchanger may be provided in plural, and the working fluid passing through the pump may be branched into the plurality of recuperators to be primarily heated, supplied to the plurality of heat exchangers, respectively, to be secondarily heated, and then supplied to the plurality of turbines or at least one of the recuperators, respectively.

The working fluid passing through the turbine may be introduced into at least one of the recuperators.

The heat exchanger may be provided in plural, and may be sequentially disposed toward a portion discharged from a portion into which waste heat gas is introduced.

The plurality of recuperators may be sequentially disposed, and the working fluid passing through the turbine may be cooled by sequentially passing through the recuperator.

In accordance with another aspect of the present disclosure, a hybrid type power generation system in which a supercritical $CO_2$ power generation system producing electric energy using supercritical $CO_2$ as a working fluid and a cogeneration system producing thermal energy and electric energy by combusting fuel are combined with each other, the hybrid type power generation system includes: at least one pump configured to circulate the working fluid; at least one recuperator configured to primarily heat the working fluid passing through the pump; at least one heat exchanger configured to reheat the working fluid heated by the recuperator using waste heat as a heat source; one turbine configured to be driven by the working fluid reheated by the heat exchangers; a condenser configured to cool the working fluid passing through the turbine and introduced into the recuperator to cool the working fluid heating the working fluid passing through the pump; and a water heater configured to heat the heating water by branching a part of the working fluid introduced into the condenser and exchanging heat between the branched working fluid and the heating water supplied from the cogeneration system and cool the working fluid, in which the supercritical $CO_2$ power generation system and the cogeneration system may share the water heater.

The working fluid passing through the condenser and the water heater may be circulated to the pump.

The heating water may be heated by any one of the heat exchangers and then supplied to the cogeneration system.

The heating water may be supplied to the water heater and then a part or all of the heating water may be supplied to heat exchanger or may be supplied from the cogeneration system to the water heater and the heat exchanger, respectively.

The working fluid passing through the pump may be primarily heated by the recuperator, transferred to the heat exchanger to be secondarily heated and then branched, and then supplied to a plurality of turbines, respectively.

The working fluid passing through the turbine may be introduced into at least one of the recuperators.

The heat exchanger may be provided in plural, and may be sequentially disposed toward a portion discharged from a portion into which waste heat gas is introduced.

The plurality of recuperators may be sequentially disposed, and the working fluid passing through the turbine may be cooled by sequentially passing through the recuperator.

The hybrid type power generation system according to an embodiment of the present invention can increase the energy output by combining a part of the components of the cogeneration power system with the supercritical $CO_2$ power generation system. In addition, it is possible to improve the thermal efficiency of the power generation cycle and actively cope with the power demand that changes by season.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a hybrid type power generation system according to a first embodiment of the present disclosure;

FIG. 2 is a block diagram illustrating a hybrid type supercritical $CO_2$ power generation system according to a second exemplary embodiment of the present disclosure;

FIG. 3 is a diagram illustrating a modified embodiment of the hybrid type power generation system of FIG. 2;

FIG. 4 is a diagram illustrating a modified embodiment of the hybrid type power generation system of FIG. 2;

FIG. 5 is a diagram illustrating a hybrid type power generation system according to a third embodiment of the present disclosure;

FIG. 6 is a diagram illustrating a hybrid type power generation system according to a fourth embodiment of the present disclosure;

FIG. 7 is a diagram illustrating a modified embodiment of the hybrid type power generation system of FIG. 6;

FIG. 8 is a diagram illustrating a modified embodiment of the hybrid type power generation system of FIG. 6;

FIG. 9 is a diagram illustrating a hybrid type power generation system according to a fifth embodiment of the present disclosure;

FIG. 10 is a diagram illustrating a modified embodiment of the hybrid type power generation system of FIG. 9; and FIG. 11 is a diagram illustrating a modified embodiment of the hybrid type power generation system of FIG. 9.

DETAILED DESCRIPTION

Hereinafter, a hybrid type power generation system according to an exemplary embodiment of the present disclosure will be described in detail with reference to the accompanying drawings.

Generally, a supercritical $CO_2$ power generation system includes a closed cycle in which $CO_2$ used for generation is not emitted to the outside, and uses supercritical $CO_2$ as a working fluid.

The supercritical $CO_2$ power generation system uses supercritical $CO_2$ as a working fluid, and therefore may use exhaust gas discharged from a thermal power plant, etc. Accordingly, the supercritical $CO_2$ power generation system may not only be used as a single generation system, but also be used for a hybrid generation system with the thermal generation system. The working fluid of the supercritical $CO_2$ generation system may also supply $CO_2$ separated from the exhaust gas and may also supply separate $CO_2$.

The supercritical $CO_2$ in the cycle (hereinafter, referred to as working fluid) passes through a compressor, and is then heated while passing through a heat source such as a heater, etc. to be a high-temperature high-pressure working fluid, thereby operating a turbine. A generator or a pump is connected to the turbine, the turbine connected to the generator produces power, and the turbine connected to the pump operates the pump. The working fluid passing through the turbine is cooled while passing through a heat exchanger and the cooled working fluid is again supplied to the compressor to be circulated within the cycle. The turbine or the heat exchanger may be provided in plural.

The supercritical $CO_2$ generation system according to various embodiments may include a system in which all the working fluids flowing within the cycle are in the supercritical state and may also include a system in which most of the working fluids are in the supercritical state and the rest of the working fluids are in a subcritical state.

Further, in various embodiments, the $CO_2$ is used as the working fluid. Here, the $CO_2$ may include pure carbon dioxide in a chemical meaning and carbon dioxide including some impurities and even a fluid in which carbon dioxide is mixed with one or more fluids as additives in general terms.

The present disclosure proposes a hybrid type power generation system that includes a plurality of heat exchangers (heaters) using waste heat gas as a heat source, and shares a hybrid type cooler of a supercritical $CO_2$ power generation cycle and a water heater which heats heating water for heating of cogeneration system (power generation for district heating).

FIG. 1 is a diagram illustrating a hybrid type power generation system according to a first embodiment of the present disclosure.

As illustrated in FIG. 1, the hybrid type power generation system according to the first embodiment of the present disclosure may be a system that includes a compressor or a pump 100 for compressing a working fluid, one recuperator 200, and two heat exchangers. In addition, two turbines may be provided, and thus a working fluid heated by passing through the recuperator 200 and the heat exchanger may be branched into and supplied to two turbines 400, respectively. The supercritical $CO_2$ power generation system and the cogeneration system share a water heater 600 and the heating water of the cogeneration system may be heated by the water heater 600 and the heat exchanger.

Each of the components is illustrated connected by a transfer tube (a line corresponding to reference numerals 1 to 26 of FIG. 1 represents a transfer tube) in which the working fluid flows. Working fluid flows along the transfer tube. When a plurality of components are integrated, the integrated configuration may be a part or an area serving as the transfer pipe. Therefore, even in this case, it is to be understood that the working fluid flows along the transfer pipe. A channel performing a separate function will be described additionally. The flow of the working fluid will be described by assigning reference numerals to the transfer tube.

Further, since the temperature of the working fluid is described by taking one of various cases as an example, it should not be understood as an absolute temperature value.

A detailed configuration of the hybrid type power generation system will be described below.

The pump 100 is driven by a low temperature turbine 410 to be described below and transmits the low temperature working fluid cooled by the cooler 500 to the recuperator 200. The recuperator 200 exchanges heat between a working fluid that has been cooled from a high temperature to a medium temperature while being expanded by passing through a low temperature turbine 410 and a high temperature turbine 430 and a working fluid passing through the pump 100. The working fluid passing through the turbine 400 is cooled and the working fluid passing through the pump 100 is recuperated and transferred to one of heat exchangers 300. The cooled working fluid is transferred to the condenser 500 and the water heater 600 to be re-cooled and then circulated to the pump 100.

A plurality of heat exchangers 300 may be provided as needed. The present embodiment describes an example in which two heat exchangers are provided. A first exchanger 310 and a second heat exchanger 330 use, as a heat source, gas (hereinafter, waste heat gas) having waste heat like exhaust gas emitted from a boiler of a power plant, and serve to exchange heat between the waste heat gas and a working fluid circulating inside a cycle to heat the working fluid with the heat supplied from the waste heat gas.

The first heat exchanger 310 and the second heat exchanger 330 may be classified into a relatively low temperature, medium temperature, high temperature or the like depending on the temperature of the waste heat gas. That is, the heat exchanger can perform heat exchange at the high temperature as it approaches an inlet end into which the waste heat gas is introduced, and performs heat exchange at the lower temperature as it approaches an outlet end through which waste heat gas is discharged.

In the present embodiment, the first heat exchanger 310 may be a heat exchanger using relatively high or medium-temperature waste gas compared to the second heat exchanger 330, and the second heat exchanger 330 may be a heat exchanger using the relatively medium or low-temperature waste gas. That is, an example in which the first heat exchanger 310 and the second heat exchanger 330 are sequentially disposed from the inlet end into which the waste heat gas is introduced toward the outlet end will be described.

The turbines 400 include a first turbine 410 and a second turbine 430, and are driven by the working fluid to drive a generator 450 connected to at least any one turbine of the turbines, thereby generating power. The working fluid is expanded while passing through the first turbine 410 and the second turbine 430, and thus the turbines 410 and 430 also serves as an expander. According to the present embodiment, the generator 450 is connected to the second turbine 430 to generate power, and the first turbine 410 serves to drive the pump 100.

The condenser 500 serves as a cooler for cooling the working fluid passing through the recuperator 200 using air or cooling water as a refrigerant. The working fluid passing through the recuperator 200 is branched into and supplied to the condenser 500 and the water heater 600 (the heater for cogeneration will be described later). The working fluid that is cooled by passing through the condenser 500 is back circulated to the pump 100.

On the other hand, the cogeneration system is a power generation system that drives a generator by a steam turbine in a thermal power plant and uses the hot exhaust heat of the turbine to perform district heating. By burning fossil fuels to heat water to produce steam, the steam turbine is driven to produce electricity. The cogeneration system also includes a heater for exchanging heat between the steam for driving the turbine and the heating water. In the present embodiment, an example in which at least one of the plurality of heaters is supplied with extra heat from the supercritical $CO_2$ power generation system will be described. The heater shared with the supercritical $CO_2$ power generation system is referred to as the water heater 600.

The heating water introduced into the water heater 600 is heated by exchanging heat with the working fluid and the waste heat gas of the supercritical $CO_2$ power generation system, and the heating water heated at an appropriate temperature is transferred to the cogeneration system (which will be described later).

Hereinafter, the flow of the working fluid and the heating water will be described.

The low-temperature working fluid compressed while passing through the pump 100 is transferred (1) to the recuperator 200 and exchange heat the working fluid passing through the first turbine 410 and the second turbine 430 to be primarily heated (7), and then is transferred to the first heat exchanger 310 to be secondarily heated (2).

A working fluid 3 reheated by the first heat exchanger 310 is branched (4A and 4B) into the first turbine 410 and the second turbine 430, respectively. The working fluid that drives the first turbine 410 and the second turbine 430 is transferred (6) to the recuperator 200 and exchanges heat with the working fluid passing through the pump 100 to be cooled. The working fluid passing through the recuperator 200 is branched (8) into the condenser 500 and the water heater 600. The working fluid passing through the condenser 500 and the water heater 600 is joined at a front end of the pump 100 and transferred to the pump 100.

Heating water 20 of the cogeneration system that is introduced into the water heater 600 exchanges heat with the working fluid branched from the front end of the condenser 500. The heating water is primarily heated by the water heater 600 and then branched, such that a part of the heating water is secondarily heated by the water heater 600 and then transferred (26) to the cogeneration system. The rest of the branched heating water is transferred (21 and 23) to the second heat exchanger 330. The heating water 24 reheated by the second heat exchanger 330 is supplied (25) to the cogeneration system and mixed with the heating water heated by the water heater 600 or used separately.

A system having only one heat exchanger may also be implemented as a modification of the embodiment. In this case, the heating water supplied from the cogeneration system is heated only by the water heater and transferred to the cogeneration system without being reheated.

In addition, as a modified example of the present embodiment, one recuperator and two heat exchangers are provided, and the heating water from the cogeneration system may be supplied to the water heater and the second heat exchanger, respectively. In this case, the heating water supplied to the water heater may be heated from the working fluid branched from the front end of the condenser and transferred to the cogeneration system, and the heating water transferred to the second heat exchanger may be heated by the second heat exchanger and transferred to the cogeneration system.

As a modified example of the present embodiment, one recuperator and two heat exchangers are provided. The heating water from the cogeneration system may be supplied to the water heater, and the entire quantity of the heating water passing through the water heater is transferred to the second heat exchanger and the heating water is reheated, which may be in turn supplied to the cogeneration system. A higher-temperature working fluid is supplied to the water heater by branching a part of the working fluid introduced into the recuperator through the turbine into the front end of the water heater to increase a temperature difference from the heating water, thereby increasing the temperature difference.

As a modified example of the present embodiment, two recuperators and two heat exchangers are provided. The heating water from the cogeneration system may be supplied to the water heater, and the entire quantity of the heating water passing through the water heater is transferred to the second heat exchanger and the heating water is reheated, which may be in turn supplied to the cogeneration system. The heat exchange efficiency in the water heater may be improved by branching a part of the working fluid introduced into the first recuperator through the turbine into the front end of the water heater.

In the hybrid type power generation system according to the first embodiment of the present disclosure having the above-described configuration, a method capable of coping with a system efficiency design and power demand by each season will be described.

Generally, the heat quantity absorbed by the waste heat recovery heat exchanger is about 50% of the waste heat. The system efficiency may be changed depending on whether the entire heat quantity absorbed is supplied to either of the cogeneration system or the supercritical $CO_2$ generation system or how much the heat quantity is divided and supplied. If the entire heat quantity absorbed is transferred to the cogeneration system, the output and efficiency of heat for heating are increased (cogeneration mode), and if the entire heat quantity is transferred to the supercritical $CO_2$ power generation system, the power output and efficiency are increased (pure power generation mode). If a part of the absorbed heat quantity is transferred to the cogeneration system, the power efficiency is partially reduced but the heating heat output may be increased (hybrid mode).

In a supercritical $CO_2$ power generation system, 40 to 60% of the total fuel energy may be produced as power (system efficiency is 40 to 60%). In the cogeneration system, about 35 to 55% % of the total fuel energy may be produced as power and 35 to 50% of the total fuel energy may be produced as thermal energy. That is, the efficiency of the cogeneration system becomes 85 to 95%.

In summer when there is no demand for thermal energy, the system may be operated in a pure power generation mode and in winter when the demand for thermal energy is high, the system may be operated in a cogeneration mode. In the cogeneration mode, the cogeneration system may produce both power and thermal energy. The system may be operated in a hybrid mode in response to a power demand even in winter.

The entire flow rate of the working fluid transferred to the condenser is supplied to the water heater, such that the supercritical $CO_2$ power generation system is converted into the cogeneration mode in the winter and the entire flow rate is supplied to the condenser, such that the supercritical $CO_2$ power generation system may be converted into the pure generation mode in summer. In addition, the hybrid mode may be realized by appropriately adjusting the flow rate of the working fluid distributed to the condenser and the water heater.

In the case of the first embodiment, the heat quantity of the waste heat absorbed in the first heat exchanger 310 and the second heat exchanger 330 may be used for heating of the working fluid and the heating water, respectively, such that it is possible to cope with the power demand and the heating heat demand. In addition, the flow rate 0 to 100% of the working fluid supplied to the condenser 500 may be supplied to the water heater 600 to cope with the power demand and the heating heat demand.

The flow rate of the working fluid branched into the condenser 500 and the water heater 600 is adjusted, such that the heat quantity recovered from the waste heat may be distributed into the cogeneration system and the supercritical $CO_2$ power generation system.

TABLE 1

| | Winter (operation in maximum thermal energy) | Summer (operation in maximum electric energy) | Spring/fall (intermediate operation) | Range |
|---|---|---|---|---|
| Power efficiency | 46% | 50% | 48% | 35~55%/40~60% |
| Heating heat efficiency | 44% | 8% | 19% | 35~50% |
| Overall efficiency | 90% | 58% | 47% | 85~95% |

Describing a detailed example with reference to the above table, since the demand for electric energy is high in summer, 50% of the waste heat absorbed by the heat exchanger 300 is completely absorbed by the supercritical $CO_2$ power generation system to increase the power output, such that the power efficiency may be operated at 50%. Here, 35% of power is a power amount that is produced by the cogeneration system, and 15% of power is a power amount produced by the supercritical $CO_2$ power generation system. The heating heat efficiency may be set to a minimum of 8%, which is realized through an economizer provided in an exhaust gas discharge end of the cogeneration system, not the supply of the waste heat.

Since the demand for the heating heat is high in winter, the entire quantity of the waste heat absorbed by the heat exchanger 300 may be transferred to the cogeneration system, such that the heating heat efficiency may be operated at 44%. The power efficiency in winter against the power efficiency in summer is reduced by 4%, but the thermal efficiency is increased by 32%, such that the maximum efficiency may be realized the entire efficiency of 90% (10% is a loss due to the temperature difference from air required during the combustion of fuel and therefore the overall efficiency is a maximum of 90%).

In spring and fall, it is possible to operate the system even in the hybrid mode, which is the middle of the cogeneration mode and the pure power generation mode, depending on the heat demand.

Assuming that the power efficiency is set to be 60% in the summer, the thermal efficiency can increase up to 44% in the winter compared to the summer. Because the power efficiency may be reduced by 0 to 4% according to the seasonal demand but the thermal efficiency is increased to 0 to 44%, the overall efficiency of the system can be improved.

As described above, the hybrid type supercritical $CO_2$ power generation system according to an embodiment of the present disclosure is used as a heat source for supplying a heat quantity to the heater of the cogeneration system by regulating the flow rate of the working fluid transferred to the condenser, such that the hybrid type supercritical $CO_2$ power generation system can cope with the energy output according to the seasonal demand.

Hereinafter, the hybrid supercritical $CO_2$ power generation system according to another embodiment of the present disclosure will be described (the detailed description of the same components and features as those of the above embodiment may be omitted). In addition, the method for coping with an efficiency design and a power demand by season is equally applied even to other embodiments, and therefore the detailed description thereof will be omitted.

FIG. 2 is a block diagram illustrating a hybrid type supercritical $CO_2$ power generation system according to a second exemplary embodiment of the present invention and FIGS. 3 and 4 are diagrams illustrating a modified embodiment of the hybrid type supercritical $CO_2$ power generation system of FIG. 2.

As illustrated in FIG. 2, the hybrid type power generation system according to the second embodiment of the present disclosure may include a first heat exchanger 310a and a second heat exchanger 330a using waste heat as a heat source. The first heat exchanger 310a and the second heat exchanger 330a may be sequentially disposed so that the first heat exchanger 310a may use high-temperature waste heat gas and the second heat exchanger 330a may be disposed to use a medium-temperature waste heat gas. The hybrid type power generation system may be a system including two recuperators 200a and two turbines 400a. In addition, the hybrid type power generation system is a system in which the cogeneration system and the supercritical $CO_2$ power generation system share a water heater 600a.

Hereinafter, the flow of the working fluid and the heating water will be described.

The working fluid 1 compressed in the pump 100a is branched (2 and 10) into the first recuperator 210a and the second recuperator 230a. In order to select a circulation channel of the working fluid, it is preferable that a rear end of the pump 100 is provided with a three-way valve (a branch point at which the working fluid is branched into two recuperators) or a two two-way valve so that the pump 100 is controlled.

The working fluid branched into the first recuperator 210a through the compressor 100a exchanges heat with a working fluid 13 expanded by passing through the turbine 400a to be primarily heated and then is transferred (3) to the first heat exchanger 310a.

The working fluid primarily heated by the first recuperator 210a is reheated by the first heat exchanger 310a and transferred (4) to the second turbine 430a. The working fluid branched into the second recuperator 230a exchanges heat with the working fluid 6 that is primarily cooled by the first recuperator 210a and then transferred to the second recuperator 230a to be primarily heated (10) and then is transferred (11) to the second heat exchanger 330a.

The working fluid reheated by the second heat exchanger 330a is supplied (12) to the first turbine 410a and drives the first turbine 410a.

The working fluid that drives the first turbine 410a and the second turbine 430a, respectively, are joined (5 and 13) at the front end of the first recuperator 210a and is introduced into the first recuperator 210a. The working fluid of which heat is lost by the working fluid passing through the pump 100a from the first recuperator 210a is transferred (6) to the second recuperator 230a and is heat-exchanged and cooled once again, and then branched (8) into the condenser 500a and the water heater 600a of the cogeneration system.

The working fluid cooled in the condenser 500a and the working fluid 9 cooled by exchanging heat with the heating water introduced into the water heater 600a are joined at the front end of the pump 100a and transferred to the pump 100a. In the water heater 600a, the heating water that is heated by being transferred with heat from the working fluid is transferred (21) to the cogeneration system.

As shown in FIG. 3, in the hybrid type power generation system, the heat exchanger 300b using the waste heat as the heat source may include a first heat exchanger 310b, a second heat exchanger 330b, and a third heat exchanger 350b. Each of the first to third heat exchangers 310b, 330b, and 350b are sequentially disposed to use high-temperature, medium-temperature, and low-temperature waste heat gases. The hybrid type power generation system may be a system including two recuperators 200b and two turbines 400b. In addition, the hybrid type power generation system is a system in which the cogeneration system and the supercritical $CO_2$ power generation system share a water heater 600b, and may be introduced with heating water branched into two paths from the cogeneration system. The heating water may be branched into and supplied to the water heater 600b and the third heat exchanger 350b, respectively. The flow of the working fluid is the same as that shown in FIG. 2.

The heating water introduced into the water heater 600b is heated by the working fluid branched from the working fluid transferred to the condenser 500b and is transferred (21) to the cogeneration system. The heating water 20 and 21 introduced into the third heat exchanger 350b is heated by the third heat exchanger 350b and transferred (22 and 23) to the cogeneration system. The heating water each transferred to the cogeneration system may be mixed and used within the cogeneration system or may be each used for separate purposes.

As shown in FIG. 4, the hybrid type power generation system includes first to third heat exchangers 310c, 330c and 350c using waste heat as a heat source, which are sequentially disposed from a high temperature portion to a low temperature portion. The hybrid type power generation system is a system in which two recuperator 200c and turbines 400c are also provided and the cogeneration system and the supercritical $CO_2$ power generation system share a water heater 600c. The heating water introduced from the cogeneration system is heated by the water heater 600c and the third heat exchanger 350c and supplied to the cogeneration system. The flow of the working fluid is the same as that shown in FIG. 2.

The heating water 20 introduced into the water heater 600c is primarily heated within the water heater 600c and then branched, such that a part of the heating water is secondarily heated within the water heater and then transferred (26) to the cogeneration system. The remainder 21 of the branched heating water is transferred (23) to the third heat exchanger 350c, reheated and then supplied (24 and 25) to the cogeneration system.

The entire quantity of the heating water introduced into the water heater may be transferred to the third heat exchanger without being branched after heated within the water heater, reheated, and then supplied to the cogeneration system.

The flow of the heating water is the same as described above, but a part of the working fluid passing through the turbine and the first recuperator may be branched and supplied to the front end of the water heater. In this case, the working fluid introduced into the water heater is mixed with the higher-temperature working fluid which does not pass through the second recuperator, such that heat exchange efficiency with the heating water may be improved.

Even when a part of the working fluid passing through the low-temperature turbine and the high-temperature turbine is branched from the front end of the first recuperator and supplied to the front end of the water heater, the same effect can be obtained.

Hereinafter, various embodiments of the present disclosure will be described in accordance with the change in the configuration of the heat exchanger, the recuperator, the pump, and the like.

FIG. 5 is a diagram illustrating a hybrid type power generation system according to a third embodiment of the present disclosure. As shown in FIG. 5, according to the third embodiment, two recuperators and three heat exchangers may be provided. First to third heat exchangers 310d, 330d, and 350d are sequentially disposed from a high temperature region to a low temperature region and use high-temperature, medium-temperature, and low-temperature waste heat gases, respectively.

According to the present embodiment, the flow of the working fluid and the heating water is the same as the first embodiment. However, the third embodiment is different from the first embodiment in that the working fluid 10 branched from the pump 100d to the second recuperator 230d is heated (11) by passing through the second heat exchanger 330d, drives (11) a first turbine 410d is driven, and then is transferred to a rear end of a first recuperator 210d instead of a front end of the first recuperator 210d and immediately transferred (6) to the second recuperator 230d.

A modified example of the third embodiment includes two recuperators and two heat exchangers. In this case, the flow of the working fluid is the same as the third embodiment, but the heating water of the cogeneration system transferred to the water heater is heated by the working fluid branched from the front end of the condenser to the water heater and then transferred to the cogeneration system.

In addition, as another modified example of the third embodiment, two recuperators and three heat exchangers may be provided, but the heating water of the cogeneration system is branched into and supplied to the water heater and the third heat exchanger, respectively.

The heating water introduced into the water heater is heated by the working fluid branched from the working fluid and transferred to the condenser, and the heating water introduced into the third heat exchanger is heated by the third heat exchanger and transferred to the cogeneration system. The heating water each heated may be transferred to the cogeneration system, and may be mixed and used within the cogeneration system or may be each used for separate purposes.

As another modified example of the third embodiment, two recuperators and three heat exchangers may be provided, but the heating water of the cogeneration system is supplied to the water heater to be heated and the entire quantity of the heating water may be transferred to the third heat exchanger, reheated, and then supplied to the third heat exchanger.

Two recuperators and the three heat exchangers are may also be provided, and the heating water is sequentially heated by passing through the water heater and the third heat exchanger, and at the same time a part of the working fluid may be branched into the front end of the second recuperator and also supplied to the front end of the water heater. A part of the working fluid may be branched from the front end of the first recuperator and supplied to the front end of the water heater. Accordingly, the heat exchange efficiency of the heating water is improved.

FIG. 6 is a diagram illustrating a hybrid type supercritical $CO_2$ power generation system according to a fourth embodiment of the present disclosure. As shown in FIG. 6, the hybrid supercritical $CO_2$ power generation system according to the fourth embodiment may include three recuperators 200e and three heat exchangers 300e. The first to third recuperators 210e, 230e, and 250e are sequentially disposed (the third recuperator is closer to the pump).

In addition, a second turbine 430e is disposed at a rear end of the first heat exchanger 310e. The first turbine 410e may be separately disposed to be connected to a discharge end through which the working fluid passing through the third recuperator 250e in the heat exchanger 300e is discharged.

The working fluid 1 having passed through the pump 100e is transferred to the third recuperator 250e, primarily heated, and then branched (2A and 2B) from the rear end of the third recuperator 250e. A part of the working fluid is branched (2A) into the second recuperator 230e and the remainder of the working fluid is branched (2B) into the second heat exchanger 330e. The working fluid transferred to the second recuperator 230e is heated (4B) by the second recuperator 230e and then transferred to the rear end of the second heat exchanger 330e to be mixed (3) with the reheated working fluid. A part of the mixed working fluid is branched into the first recuperator 210e and the remainder of the working fluid is branched (4A) into the first heat exchanger 310e. The working fluid reheated by the first heat exchanger 310e is transferred (5A) to the second turbine 430e, and the working fluid driving the second turbine 430e is transferred (6A) to the first recuperator 210e. The working fluid transferred to the first recuperator 210e through the second turbine 430e exchanges heat with the working fluid supplied to the first recuperator 210e through the second heat exchanger 330e, is cooled, and is then supplied to the second recuperator 230e.

The working fluid supplied to the first recuperator 210e through the second heat exchanger 330e is recuperated after being heat-exchanged and is supplied (5B) to the first turbine 410e. The working fluid passing through the first turbine 410e sequentially passes through the second recuperator 230e and the third recuperator 250e and is heat-exchanged to be cooled (7 and 8). The working fluid passing through the third recuperator 250e is branched into a condenser 500e and a water heater 600e.

The heating water 20 of the cogeneration system that is introduced into the water heater 600 exchanges heat with the working fluid branched from the front end of the condenser 500. The heating water is primarily heated by the water heater 600 and then partially branched to be secondarily heated within the water heater 600e and then transferred (26) to the cogeneration system. The remainder of the heating water is transferred (21 and 23) to the second heat exchanger 330e. The heating water 24 reheated by the second heat exchanger 330e is supplied (25) to the cogeneration system and mixed with the heating water heated by the water heater 600e or used separately.

As a modified example of the present embodiment, the heating water may be supplied to the water heater and then primarily heated, and then the entire amount of the heating water may be transferred to the third heat exchanger, reheated, and then supplied to the cogeneration system. In addition, a part of the working fluid passing through the turbine from the front end of the first recuperator is branched and supplied to the front end of the condenser, and the working fluid supplied to the front end of the condenser is mixed with the working fluid passing through the third recuperator and then may be supplied to the condenser and the water heater, respectively.

FIGS. 7 and 8 are diagrams illustrating a modified embodiment of the hybrid type power generation system of FIG. 6.

As shown in FIG. 7, as a modified example of the fourth embodiment, the third heat exchanger may be deleted, and only a first heat exchanger 310f and a second heat exchanger 330f may be provided. The first heat exchanger 310f may use high-temperature waste heat gas and the second heat exchanger 330f may use medium-temperature waste heat gas. In this case, the heating water of the cogeneration system is transferred only to a water heater 600f and thus heated by the working fluid.

As shown in FIG. 8, a modified example of the fourth embodiment may include first to third heat exchangers 310g to 350g, in which the first to third heat exchangers 310g to 350g are sequentially disposed from a high temperature region to a low temperature region to use high-temperature, medium-temperature, and low-temperature waste gases, respectively. The heating water from the cogeneration system may be supplied to a water heater 600g and the third heat exchanger 350g, respectively, to be heated. In the embodiment of FIGS. 7 and 8, the flow of the working fluid is the same as the embodiment of FIG. 6.

FIG. 9 is a diagram illustrating a hybrid type power generation system according to a fifth embodiment of the present invention. As shown in FIG. 9, in the fifth embodiment of the present disclosure, two recuperators, two heat exchangers, two pumps, and one turbine may be provided. A first heat exchanger 310h may be disposed in a high temperature region and a second heat exchanger 330h may be disposed in a medium or low-temperature region.

A first pump 110h and a second pump 130h may be disposed in parallel, and one turbine 400h drives all of a generator 450h and the first pump 110h and the second pump 130h. A separate motor may be provided to drive the first pump 110h and the second pump 130h, respectively.

The working fluid passing through the first pump 110h is transferred (1) to a second recuperator 230h and the working fluid that is heat-exchanged and recuperated by the second recuperator 230h is transferred (2) to a rear end of the second pump 130h. The working fluid 12 passing through the second pump 130h is joined with the working fluid primarily heated by the second recuperator 230h and then transferred (3) to the second recuperator 230h. The working fluid recuperated by the first recuperator 210h is transferred (4) to the first heat exchanger 310h and then transferred (5) to the turbine 400h.

The working fluid driving the turbine 400h exchanges heat with the working fluid passing through the second pump 130h in the first recuperator 210h to be cooled and then is transferred (7) to the second recuperator 210h, and the working fluid passing through the first pump 110h is recuperated by the second recuperator 230h. The working fluid passing through the second recuperator 230h is once branched from the rear end of the second recuperator 230h and transferred (11) to the second pump 130h, and the remainder 8 of the working fluid is partially branched into a condenser 500h and the rest is supplied to the water heater 600h.

The heating water 20 of the cogeneration system that is introduced into the water heater 600h exchanges heat with the working fluid branched from the front end of the condenser 500h. The heating water is primarily heated by the water heater 600h and then partially branched to be secondarily heated by the water heater 600h and then transferred (26) to the cogeneration system. The rest of the heating water is transferred (21 and 23) to the second heat exchanger 330h. The heating water 24 reheated by the second heat exchanger 330h is supplied (25) to the cogeneration system and mixed with the heating water heated by the water heater 600h or used separately.

FIGS. 10 and 11 are diagrams illustrating a modified embodiment of the hybrid type power generation system of FIG. 9. As illustrated in FIG. 10, as a modified example of the fifth embodiment, only one heat exchanger disposed in a high temperature region may be provided and operated. In this case, the flow of the working fluid is the same as the fifth embodiment, and the heating water of the cogeneration system is introduced (20) into a water heater 600i, heated by the working fluid, and then supplied (21) to the cogeneration system again.

As shown in FIG. 11, as a modification of the fifth embodiment, two heat exchangers may be operated but a first heat exchanger 310j may be disposed in a high temperature region and a second heat exchanger 330j may be disposed in a medium or low temperature region. The heating water from the cogeneration system may be supplied to a water heater 600j and the third heat exchanger 350g, respectively, to be heated.

In addition, as a modified example of FIG. 11, the entire quantity of the heating water introduced into the water heater to be heated may be transferred to the second heat exchanger to be reheated, and then supplied to the cogeneration system.

In the above-described various embodiments, the heating water supplied to the heater of the cogeneration system is heated by the working fluid of the supercritical $CO_2$ power generation system. In addition, the thermal energy heating the heating water may be supplied from the heat exchanger using waste heat as the heat source.

The hybrid system sharing the condenser of the condenser of a supercritical $CO_2$ power generation system and the heater of the cogeneration system may be operated to increase the energy output. In addition, it is possible to improve the thermal efficiency of the power generation cycle and actively cope with the power demand that changes by season.

Although the preferred embodiments have been disclosed for illustrative purposes, those skilled in the art will appreciate that various modifications, additions and substitutions are possible, without departing from the scope and spirit of the accompanying claims and their equivalents. Furthermore, the above advantages and features are provided in described embodiments, but shall not limit the application of such issued claims to processes and structures accomplishing any or all of the above advantages.

What is claimed is:

1. A hybrid type power generation system comprising:
a cogeneration system producing thermal energy and electric energy by combusting fuel;
a water heater externally coupled to the cogeneration system and operable to heat heating water supplied from the cogeneration system and to return the heating water heated by the water heater to the cogeneration system; and
a supercritical $CO_2$ power generation system producing electric energy using supercritical $CO_2$ as a working fluid, the supercritical $CO_2$ power generation system including:
  at least one pump operable to circulate the working fluid;
  at least one recuperator operable to heat the working fluid passing through the at least one pump;
  at least one heat exchanger operable to reheat the working fluid heated by the at least one recuperator using waste heat as a heat source;
  one additional heat exchanger externally coupled to the cogeneration system and operable to heat the heating water using the waste heat as a heat source and to provide the heating water heated by the additional heat exchanger to the cogeneration system separately from the returned heating water from the water heater;
  a plurality of turbines operable to be driven by the working fluid reheated by the at least one heat exchanger; and
  a condenser operable to cool the working fluid passing through at least one of the turbines and introduced into the at least one recuperator,
  wherein the water heater is coupled to the one additional heat exchanger and is further operable to cool the working fluid by branching a part of the working fluid introduced into the condenser and exchanging heat between the branched working fluid and the heating water supplied from the cogeneration system, and to supply at least a part of the heating water to the one additional heat exchanger.

2. The hybrid type power generation system of claim 1, wherein the condenser, the water heater and the at least one pump are coupled such that working fluid passing through the condenser and the water heater is circulated to the at least one pump.

3. The hybrid type power generation system of claim 1, wherein
the at least one pump is coupled to the at least one recuperator to supply the working fluid heated by the at least one pump to the at least one recuperator,
the at least one recuperator is coupled to the at least one heat exchanger to transfer the working fluid to the at least one heat exchanger, and
the at least one heat exchanger includes a plurality of heat exchangers respectively coupled to the plurality of turbines to branch the working fluid and supply the working fluid to the plurality of turbines.

4. The hybrid type power generation system of claim 1, wherein
the at least one recuperator consists of a plurality of recuperators, the at least one heat exchanger consists of a plurality of heat exchangers, and the at least one pump is coupled to the plurality of recuperators to branch the working fluid into the plurality of recuperators,
the plurality of recuperators are respectively coupled to the plurality of heat exchangers to supply the working fluid to the plurality of heat exchangers, and
the plurality of heat exchangers are respectively coupled to the plurality of turbines to supply the working fluid to the turbines.

5. The hybrid type power generation system of claim 4, wherein at least one of the turbines is coupled to the at least one recuperator to supply the working fluid to the at least one recuperator.

6. The hybrid type power generation system of claim 1, wherein
the at least one recuperator consists of a plurality of recuperators, the at least one heat exchanger consists of a plurality of heat exchangers, and the at least one pump is coupled to the plurality of recuperators to branch the working fluid into the plurality of recuperators,
the plurality of recuperators are respectively coupled to the plurality of heat exchangers to supply the working fluid to the plurality of heat exchangers, and
at least one of the plurality of heat exchangers is coupled to at least one of the plurality of recuperators to supply the working fluid to the recuperator.

7. The hybrid type power generation system of claim 1, wherein at least one of the turbines is coupled to the at least one recuperator to supply the working fluid to the at least one recuperator.

8. The hybrid type power generation system of claim 1, wherein the at least one heat exchanger consists of a plurality of heat exchangers sequentially disposed from a portion into which waste heat gas is introduced toward a portion where the waste heat gas is discharged, and
wherein the one additional heat exchanger is disposed closest to the portion where the waste heat gas is discharged.

9. The hybrid type power generation system of claim 1, wherein the at least one recuperator consists of a plurality of recuperators arranged sequentially, and the turbines are coupled to at least one of the recuperators to supply the working fluid to the sequential recuperators.

10. The hybrid type power generation system of claim 1, wherein the water heater comprises:
a first transfer pipe configured to be connected to the cogeneration system to receive the heating water supplied from the cogeneration system;
a second transfer pipe configured to be connected to the cogeneration system to return the heating water heated by the water heater to the cogeneration system; and
a third transfer pipe having a first end configured to be connected to the water heater between the first and second transfer pipes and a second end configured to be connected to the one additional heat exchanger to supply the part of the heating water to the one additional heat exchanger.

11. A hybrid type power generation system comprising:
a cogeneration system producing thermal energy and electric energy by combusting fuel;
a water heater externally coupled to the cogeneration system and operable to heat heating water supplied from the cogeneration system and to return the heating water heated by the water heater to the cogeneration system; and a supercritical $CO_2$ power generation system producing electric energy using supercritical $CO_2$ as a working fluid, the supercritical $CO_2$ power generation system including:
- at least one pump operable to circulate the working fluid;
- at least one recuperator operable to heat the working fluid passing through the at least one pump;
- at least one heat exchanger operable to reheat the working fluid heated by the at least one recuperator using waste heat as a heat source;
- one additional heat exchanger externally coupled to the cogeneration system and operable to heat the heating water using the waste heat as a heat source and to provide the heating water heated by the additional heat exchanger to the cogeneration system separately from the returned heating water from the water heater;
- one turbine operable to be driven by the working fluid reheated by the at least one heat exchanger; and
- a condenser operable to cool the working fluid passing through the one turbine and introduced into the at least one recuperator,
- wherein the water heater is coupled to the one additional heat exchanger and is further operable to cool the working fluid by branching a part of the working fluid introduced into the condenser and exchanging heat between the branched working fluid and the heating water supplied from the cogeneration system, and to supply at least a part of the heating water to the one additional heat exchanger.

12. The hybrid type power generation system of claim 11, wherein the condenser, the water heater and the at least one pump are coupled such that working fluid passing through the condenser and the water heater is circulated to the at least one pump.

13. The hybrid type power generation system of claim 11, wherein
the at least one pump is coupled to the at least one recuperator to supply the working fluid heated by the at least one pump to the at least one recuperator,
the at least one recuperator is coupled to the at least one heat exchanger to transfer the working fluid to the at least one heat exchanger, and
the at least one heat exchanger includes a plurality of heat exchangers coupled to the one turbine to branch the working fluid and supply the working fluid to the one turbine.

14. The hybrid type power generation system of claim 11, wherein the one turbine is coupled to the at least one recuperator to supply the working fluid to the at least one recuperator.

15. The hybrid type power generation system of claim 11,
wherein the at least one heat exchanger consists of a plurality of heat exchangers sequentially disposed from a portion into which waste heat gas is introduced toward a portion where the waste heat gas is discharged, and
wherein the one additional heat exchanger is disposed closest to the portion where the waste heat gas is discharged.

16. The hybrid type power generation system of claim 11, wherein the at least one recuperator consists of a plurality of recuperators arranged sequentially, and the one turbine is coupled to at least one of the recuperators to supply the working fluid to the sequential recuperators.

17. The hybrid type power generation system of claim 11, wherein the water heater comprises:
a first transfer pipe configured to be connected to the cogeneration system to receive the heating water supplied from the cogeneration system;
a second transfer pipe configured to be connected to the cogeneration system to return the heating water heated by the water heater to the cogeneration system; and
a third transfer pipe having a first end configured to be connected to the water heater between the first and second transfer pipes and a second end configured to be connected to the one additional heat exchanger to supply the part of the heating water to the one additional heat exchanger.

* * * * *